Dec. 30, 1969

N. O. ROSAEN ET AL 3,486,622

BAYONET FILTER

Filed Jan. 18, 1967

INVENTORS
NILS O. ROSAEN
ROBERT L. ROSETH
CARL A. BROWN
BY Harke, Kinz & Giffen
ATTORNEYS

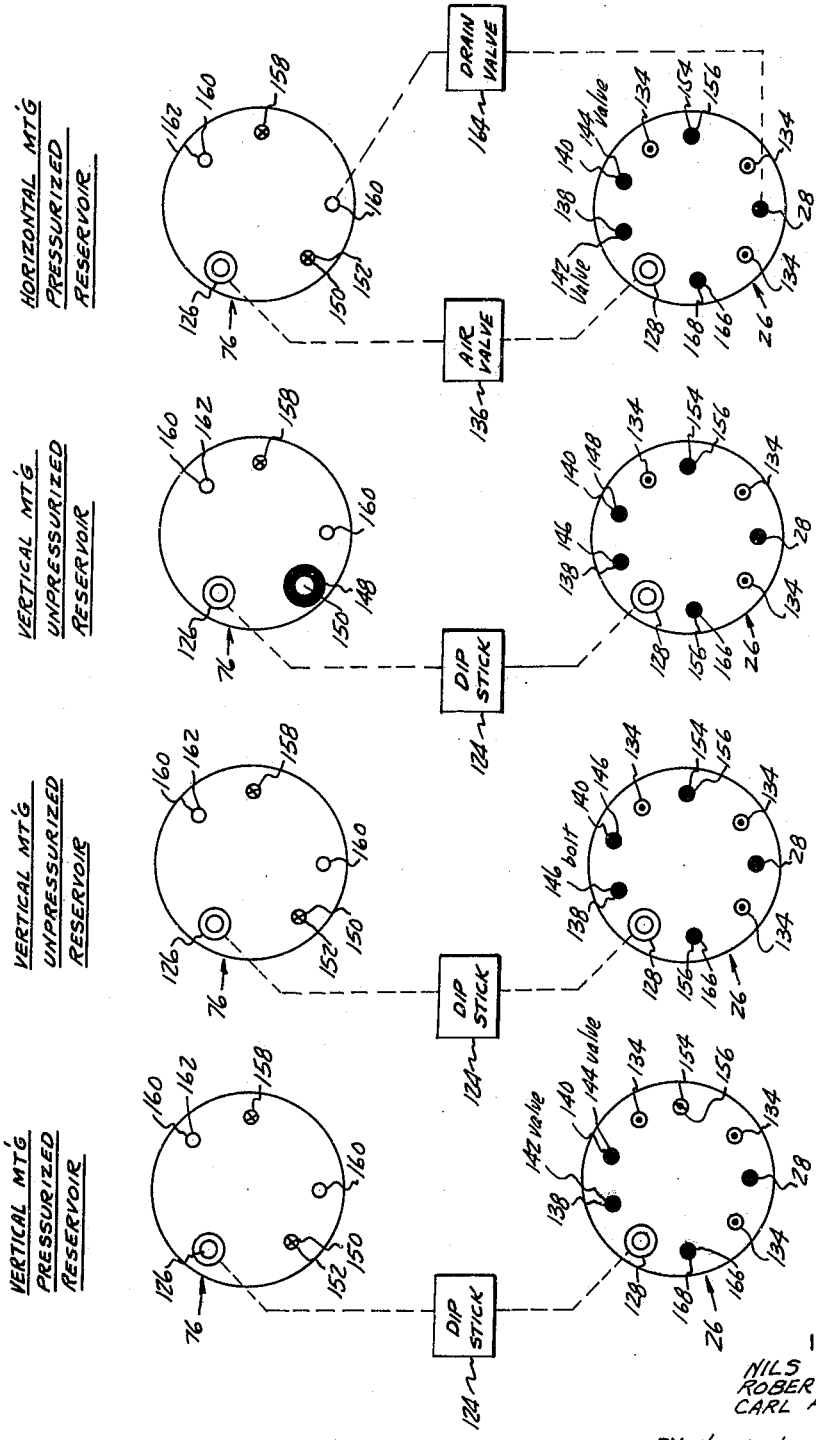

United States Patent Office 3,486,622
Patented Dec. 30, 1969

3,486,622
BAYONET FILTER
Nils O. Rosaen, Bloomfield Hills, Mich., Robert L. Firth, Minneapolis, Minn., and Carl A. Brown, Birmingham, Mich., assignors, by mesne assignments, to Parker-Hannifin Corporation, Cleveland, Ohio, a corporation of Ohio
Filed Jan. 18, 1967, Ser. No. 614,767
Int. Cl. B01d 35/14
U.S. Cl. 210—90                                   12 Claims

ABSTRACT OF THE DISCLOSURE

A fluid filter device having a housing submerged in a fluid reservoir with an opening registering with the filler opening of the reservoir. The filler opening has a size accommodating the insertion or withdrawal of a filter cartridge from the housing as well as a replenishing charge of fluid. A multi-functional, removable, filler opening cover supports the filter cartridge for movement within the housing between a filtering position when the filter element is unclogged and a by-pass position when the filter element is clogged.

BACKGROUND OF THE INVENTION

This invention relates to a filter device having a housing adapted to be carried in a submerged position in the reservoir of a fluid system with means permitting insertion and withdrawal of the filter element from the housing. Submerged filters have heretofore been provided in the prior art but in general they have required elaborate structure to permit the filter element to be inserted and withdrawn from its submerged position for replacement or cleaning. Proper servicing of the filter element of such devices is difficult thereby resulting in faulty lubrication of the working members associated with the system.

Another problem associated with prior art devices utilized in pressurized systems, and particularly with fluid systems forming a part of mobile equipment, is that such devices require the removal of part of the filter housing to replace the filter element. Furthermore installation of prior art devices in conventional systems usually requires extensive modification of existing structure.

SUMMARY

The preferred embodiment of the present invention, which will be subsequently described in detail, obviates the aforementioned problems by providing a relatively simple structure for supporting the filter element in a submerged filtering position within the reservoir. Although the preferred embodiment is described with reference to a pressurized system, it also has utility with a non-pressurized system.

The supporting structure includes a housing carried within the reservoir with an open end registering with the filler opening of the reservoir. A removable cover provides means for sealing the filler opening and also cooperates with the housing to support the filter cartridge for movement between positions in the housing dictated by the condition of the filter element. A clean filter element is positioned between inlet and outlet ports of the housing. As the filter element accumulates foreign matter, a pressure differential builds up between the inlet and outlet to produce a force effective to move the filter from a filtering position toward a by-pass position permitting continuous operation of the system while suspending the filtering function. Means responsive to the movement of the filter element provide a visual indication of the condition of the filter element exteriorly of the reservoir so that replacement or cleaning can be effected.

The preferred embodiment of the present invention reduces the cost of purifying systems having pressurized reservoirs by combining the filter device with the filler opening of the system. A dip stick associated with the cover member provides means for determining when the fluid level in the system has been reduced to a level requiring a fresh charge of fluid. The cover member can be readily separated from the filler opening to accommodate a replenishing fluid charge without removing the filter assembly.

The cover member, in addition to supporting the filter device, and accommodating the dip stick, is provided with suitable apertures to accommodate a pressure gage, breather cap, and tie down bolts depending on the fluid system it is intended to accommodate.

Thus, in a pressurized system, the cover member will accommodate a dip stick associated with a reservoir decompression valve, and if combined with a horizontally mounted filter, a valve for admitting air into the filter in addition to a valve for draining oil from the filter. The unused apertures are preferably closed with transparent, sealed caps permitting the user to view a pressure gage carried by the filter housing.

The same cover member may also be used with an unpressurized system to accommodate the various devices associated with such a system. Thus, the cover accommodates a dip stick, a breather cap, and if associated with a horizontally mounted filter device, a suitable drain valve.

It is therefore an object of the present invention to improve filter devices for a fluid system by providing an open ended housing mounted within the reservoir of the system with the open end registering with the filler opening to permit insertion and withdrawal of the filter cartridge through the filler opening.

It is another object of the present invention to provide an interchangeable cover member for fluid systems which will accommodate fixtures related to pressurized systems as well as fixtures related to non-pressurized systems.

Still another object of the present invention is to provide a multi-purpose cover member for an access opening in a fluid system suitably apertured to accommodate fixtures related to an opening below the normal fluid level of the system such as a drain fixture, as well as fixtures related to an opening above the normal fluid level such as a breather cap.

It is still another object of the present invention to reduce the manufacturing cost of mobile fluid filter systems by combining a fluid filter device with the filler opening cover of the system with means for supporting a filter element for movement toward and away from the cover between a first position wherein the filter element is disposed in a filtering relationship with the normal fluid passage of the system and a second position wherein the filter element is removed from the fluid passage of the system.

It is a still further object of the present invention to provide an improved filter device for a fluid reservoir with a filter element supported in a submerged position by a housing mounted in the interior of the reservoir, and a cover member mounted on the exterior of the reservoir for separation from the housing to permit removal of the filter element without disassembly of the housing.

Still further objects and advantages of the present invention will readily occur to one skilled in the art to which the invention pertains upon reference to the following detailed description.

BRIEF DESCRIPTION OF THE DRAWINGS

The description makes reference to the accompanying drawings in which like reference character refer to like parts throughout the several views and in which:

FIGS. 4–7 schematically illustrate various arrangements which the preferred, multi-functional closure assembly accommodates.

DESCRIPTION OF THE PREFERRED EMBODIMENT

Figure 1:
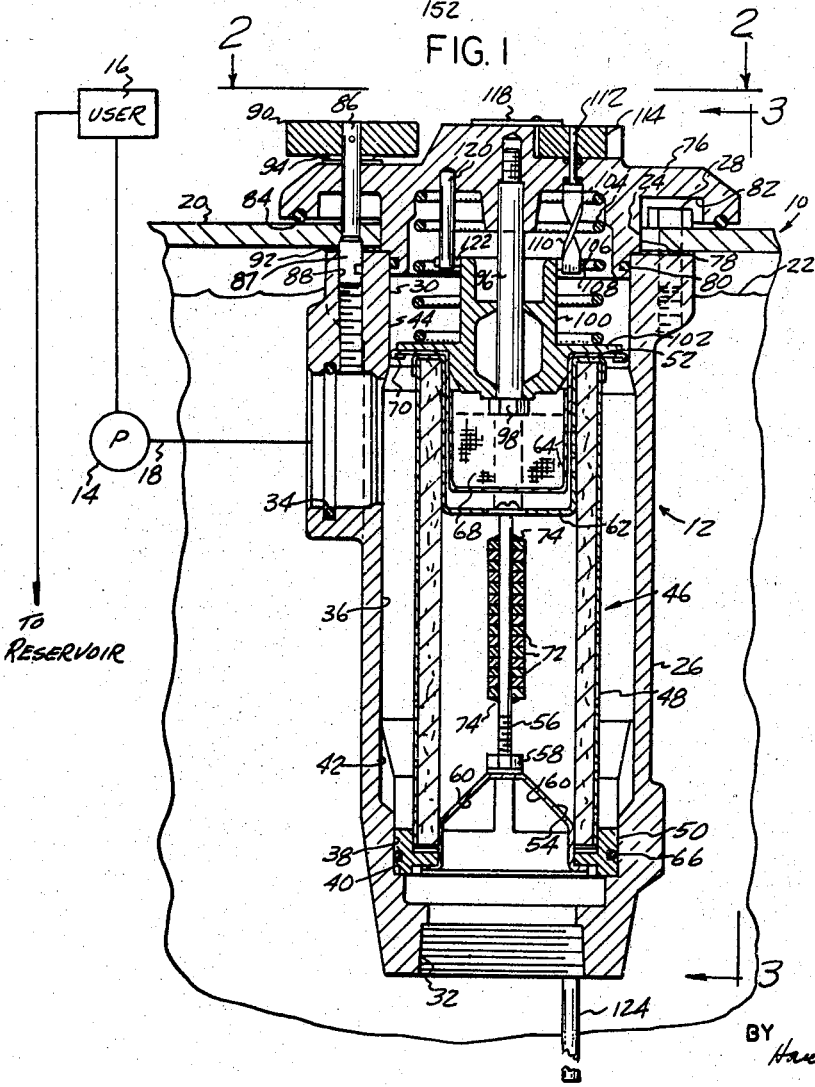
FIG. 1 is a longitudinal sectional view through a filter device illustrating the preferred embodiment of the invention and incorporated in a fluid system in which other components are illustrated schematically.

Referring to the drawings for a more detailed description of the present invention, a preferred fluid system is illustrated in FIGURE 1 as comprising a fluid reservoir 10, a filter device generally indicated at 12, a fluid pump 14, and a fluid user 16. The filter device 12, the pump 14 and the user 16 are connected by a conduit 18.

The fluid reservoir preferably comprises a top plate 20 and is shown as being partially filled with a suitable fluid 22. An opening 24 is defined in the top plate 20.

The filter device 12 includes a tubular housing member 26 secured to the top plate 20 and in the interior of the reservoir 10 by a plurality of threaded fasteners 28 only one of which is shown.

The housing 26 is positioned so that its upper open end 30 registers with the opening 24 of the top plate 20. The housing 26 extends downwardly a sufficient distance so that its lower end is disposed below the level of the fluid 22. An inlet opening 32 is defined at the lower end of the housing 26 and axially opposite the upper open end 30.

A discharge opening 34 is axially spaced from the inlet opening 32 and provides a lateral connection between the housing 26 and the conduit 18.

The housing 26 defines a cylindrical filter chamber 36 which is fluidly connected to the discharge opening 34. The chamber 36 is preferably formed on an axis common with the inlet 32 and the upper open end 30. The chamber 36 is circumferentially narrowed adjacent the inlet 32 to form a cylindrical guideway 38 having a lower end terminating with an annular seat 40. A plurality of annularly spaced recesses 42 are provided in the guide surface 38 with their lower ends axially spaced from the annular seat 40.

The chamber 36 is preferably slightly circumferentially narrowed adjacent its upper open end 30 to define an upper cylindrical guideway 44 formed on an extension of the axis of the lower cylindrical guideway 38.

A filter cartridge generally indicated at 46 is disposed in the chamber 36 intermediate the inlet 32 and the discharge opening 34. The filter cartridge 46 comprises a cylindrical, elongated meshed filter element 48 having its lower end seated in a piston-like cap 50. The filter element 48 and cap 50 are sandwiched between an upper cap member 52 and a lower cup-shaped cap member 54 and locked therebetween by an elongated rod 56 having its lower end threaded in a nut 58 fixed to the lower cap member 54.

The lower cap member 54 is provided with a plurality of annularly spaced apertures 60 which permit fluid communication between the inlet 32 and the interior of the filter element 48. The upper cap member 52 has a cup-shaped section 62 extending into the filter element 48 with a plurality of annularly spaced apertures 64.

The piston like cap 50 carries a piston ring 66 which slidingly engages the low guideway 38.

A meshed, cup-shaped filter element 68 is nested within the upper cap member 62 and is therein retained by an annular retainer member 70 which seats against the upper surface of the upper cap member 62. The retainer 70 has a periphery corresponding to the upper guideway 44 and is slidably engaged therewith.

It can therefore be seen that the filter cartridge 46 is axially slidably movable toward and away from the inlet 32 between a lower extreme position wherein the cap member 50 is disposed on the seat 40 thus providing a fluid flow axially into the filter element 48 and radially outwardly toward the discharge opening 34. The filter cartridge 46 is axially movable away from the seat 40 and the inlet 32 to a position wherein the cap 50 registers with the annular recesses 42 so that fluid flow from the inlet 32 by-passes around the cap 50, and the filter element 48 for delivery directly to the discharge opening 34.

A plurality of magnets 72 are preferably carried by the rod 56 and retained thereon by retainer members 74. The magnets 72 function to remove particles of magnetically attractive material from the fluid as it passes in filtering relationship through the filtering element 48.

A multi-fractional cover 76 normally closes off the opening 24 and has an annular portion 78 on the inner side thereof with a diameter corresponding to the diameter of the opening 24 in the top plate 20. The lower end of the annular portion 78 is reduced to a diameter accommodating the inner diameter of the open end 30 of the housing 26. An annular seal 80 is carried adjacent the inner end of the annular portion 78 and engages the open end 30 to provide a fluid type seal between the cover 76 and the housing 26 when the cover is in its closed position.

The cover 76 has an annular recess 82 which accommodates the heads of the threaded fasteners 28.

An annular seal 84 is provided on the underside of the cover 76 and seats on the upper surface of the top plate 20 so that when the cover 76 is in its locked position, a fluid tight seal is provided between the cover 76 and the reservoir top plate 20.

The cover 76 is attached to the plate 20 and housing 26 by a pair of annularly spaced studs 86 which extend through the top plate 20 and engage check valve inserts 87 carried within threaded bores 88 provided in the housing 26. A handle 90 is pinned to the upper end of each of the studs 86 and provides means for turning the stud 86 so that the housing 26 can be drawn tightly up against a gasket 92 disposed between the upper end of the housing 20 and the interior surface of the top plate 20. Thus, it can be seen that the studs 86 provide a means for rigidly locking the cover 76 in place over the opening 24 and for separating the cover 76 from the opening 24. The check valves 87 provide means for relieving the pressure within the reservoir when removing cover 76 from top plate 20.

A washer 94 is disposed between each handle 90 and the upper surface of the cover 76 to provide a bearing surface for the handle 90 when it is being manipulated.

An elongated rod member 96 is carried by the cover 76 and extends axially downwardly into the housing 26 with an enlarged head 98 extending into the filter cartridge 46.

A cap 100 axially slidably carried by the rod 96 has a circumferential flange 102 bearing against the retainer 70. A spring bias member 104 disposed between the cap 76 and the flange 102 normally urges the cap 100 downwardly and away from the cap 76. Thus the cap 100 acts to urge the filter cartridge 46 toward the inlet 32.

As thus far described, the preferred filter device operates as follows: The filter cartridge 46 is normally urged downwardly toward the inlet 32 so that the piston-like cap 50 is seated against the seat 40. The fluid enters the inlet 32 and is delivered axially into the filter element 48 and the radially outwardly through the filter element 48 for discharge through the opening 34. As the filter element 48 becomes clogged, a pressure differential is created across opposite faces of the cap 50. As viewed in FIGURE 1, the upper face of the cap 50 which is exposed to the discharge pressure and the lower face which is exposed to the inlet fluid pressure develop a net force on the cap 50 tending to overcome the normal urging of the spring 104 so that the filter cartridge 46 is moved away from the inlet 32 and the seat 40. As this pressure differential builds up, due to an accumulation of foreign matter on the filter element 48, the filter cartridge continues to move away from the inlet 32 until the cap 50 registers with the recessses 42 thus opening up a by-pass route from the inlet 32 around the cap 50 and adjacent the walls of chamber 36 on the exterior side of the filter element 48.

Thus, it is to be understood that the spring 104 has a stiffness corresponding to a selected filtering condition of the filter element 48 so that when the filter element has clogged to a predetermined condition the by-pass route is opened up providing a direct passage from the inlet 32 to the discharge opening 34 and by-passing the filter cartridge 46.

In order to replace the clogged filter element 48, the studs 86 are backed off to relieve the pressure within the reservoir and then removed so that the cap 76 may be separated from the opening 24. The filter element 48 is removed upwardly through the opening 30 in the housing 26 and the reservoir opening 24.

The preferred embodiment of the present invention is also provided with means for indicating the position of the filter cartridge within the housing 26 so that the filtering condition of the filter element 48 can be visually observed exteriorly of the preferred filter device. This indicating means comprises an upper annular flange 106 formed at the upper end of the cap 100. A radially inwardly extending slot 108 formed in the flange 106 engages an elongated actuator element 110 provided with a regular twist about its longitudinal axis from end to end. A pin 112 journaled for rotation in the cap 26 has a lower end fixed to the actuator element 110 and an upper end secured to a pointer member 114.

Figure 2:
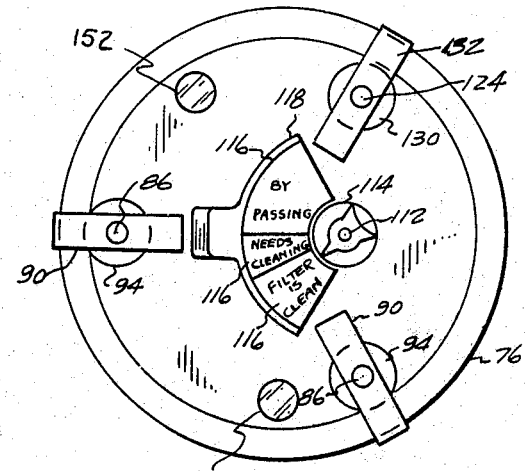
FIG. 2 is a plan view of the preferred filter device illustrated in FIG. 1 and taken along the lines 2—2 of FIG. 1.

As can best be seen in FIGURE 2, the pointer member 114 points to suitable indicia 116 corresponding to the position of the filter cartridge 46 and formed on an indicator plate 118. As the filter cartridge 46 moves away from the inlet 32, it forces the cap 100 toward the cover 76 so that the twist of the actuator member 110 in combination with the slot 108 produces a corresponding rotation of the pin 112 and the pointer 114.

A pin 120 extends downwardly from the cover 76 and engages a slot 122 formed in the flange 106. The pin 120 helps to prevent rotation of the cap 100.

Figure 3:
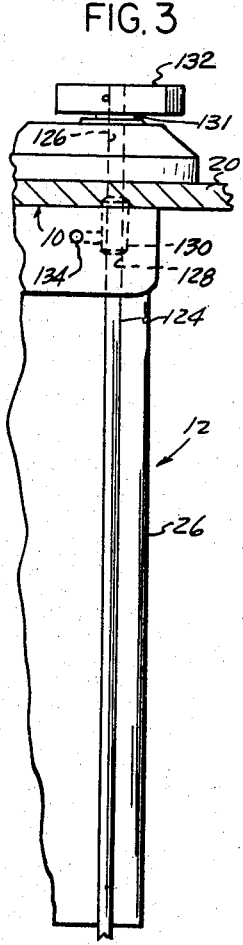
FIG. 3 is a fragmentary view taken along lines 3—3 of FIG. 1 and illustrating a preferred dip stick.

Now referring to FIGURE 3, an elongated dip stick 124 extends through an aperture 126 in cover 76, and the top plate 20 and an aperture 128 provided in the housing 26 and has a sufficient length to extend into the reservoir 10 and below the normal fluid level. A check valve insert 130 provides a fluid tight seal when the dip stick is in its normal position inserted in the reservoir 10. The upper end of the dip stick carries a handle 128 which is pinned thereto and seated on a washer 131 which provides a bearing surface for the handle 132. A horizontal mounting passage 134 provides communication between the interior and exterior of housing 26 and the dip stick aperture 128 to permit equalization of the fluid pressures when the dip stick is withdrawn.

The level of the fluid 22 in the reservoir 10 can be ascertained merely by withdrawing the dip stick 124 from within the reservoir and observing how much of the length of the dip stick is wetted. Preferably indicia can be marked on the dip stick indicating a minimum safe fluid level. When the level of the fluid 22 has lowered sufficiently to require a replenishment quantity of fluid, the cover 76 is separated from the opening 24 and a fresh supply of fluid poured therein. The replenishment fluid is preferably supplied with the filter 68 in place so that any foreign matter contained in the fluid can be separated before the fresh fluid goes into the fluid system.

FIGURES 4–7 illustrate the versatility of the preferred cover 76 and the housing 26 achieved by pre-drilling a selected number of apertures in each member. The combination of these members is useful in a variety of mounting arrangements thereby eliminating the necessity for providing cover and housing members having a different pattern of mounting apertures for each mounting arrangement.

Preferably the cover 76 has 5 apertures and the housing 26 9 apertures including 3 apertures 134 which are not drilled through the housing 26. All the apertures in the cover 76 are drilled through the cover 76.

FIGURES 4–6 illustrate various vertical mounting arrangements and FIGURE 7 illustrates a horizontal mounting arrangement wherein the cover 76 and housing 26 are disposed between the fluid level in the system. Thus, wherein the apertures 126 and 128 accommodate a dip stick accessory 26 in the vertical arrangement, they accommodate a valve 136 in the horizontal arrangement for admitting air into the housing and for draining the reservoir.

FIGURES 4 and 7 illustrate apertures 138 and 140 provided in housing 26 for accommodating a pressure relief valve 142 and a check valve 144 in a pressurized system. In an unpressurized system, apertures 138 and 140 accommodate hollow bolts 146 to permit fluid communication between interior and exterior sides of housing 128. Hollow bolts 146 are associated with a breather cap 148 which is attached to aperture 150 provided in cover 76 as shown in FIG. 6. When the breather cap 148 is mounted separately from cap 76, preferably a transparent cap 152 is mounted in the aperture 150 in a fluid tight relationship.

The housing 26 also has an aperture 154 to accommodate an air gage 156 in the pressurized arrangement shown in FIG. 4. Aperture 154 receives a pressure tight bolt 156 in the arrangements shown in FIGS. 5–7. The cover 76 has an aperture 158 associated with aperture 154 and which accommodates a transparent cap 152 to permit visual observation of the gage 156.

The cover 76 has a pair of apertures 160 to accommodate studs 162 which are threadably received by apertures 28 and 134 as indicated in FIGS. 4–6 to attach the cover 76 to housing 26. However, one of the apertures 160 combines with aperture 28 of the housing to accommodate a drain valve 164 in the horizontal arrangement illustrated in FIG. 7.

The housing 26 has a ninth aperture 166 which in the pressurized arrangements accommodates an air cleaning valve 168 and in the unpressurized arrangements accommodates a pressure tight bolt 156.

We claim:
1. In a fluid system having a fluid reservoir, said reservoir having an opening disposed above the level of fluid therein, a filter device comprising:
  a housing disposed within said reservoir and having a cylindrical filter chamber and an inlet and an outlet open to said chamber, said housing being further provided with an upper opening registering with said filter chamber;
  means carried by said reservoir for supporting said housing with said inlet disposed below the fluid level in said reservoir and said opening in registry with said reservoir opening;
  a filter assembly carried by said housing and including a cylindrical filter element having a lower open end in registry with said inlet and being spaced from a portion of the housing wall defining said filter chamber to define a substantially annular outlet chamber communicating with said outlet;
  valve means carried by said housing and associated with said filter assembly for movement between a first position closing fluid flow directly from said reservoir to said annular chamber and a second position upon a predetermined clogging of said filter element, said valve means opening fluid flow directly from said reservoir to said outlet chamber at said second position;

a cover member secured to the reservoir top wall for closing said reservoir opening and means carried by said cover member to normally close the upper end of said filter element and removable with said cover member to permit the introduction of a replenishing quantity of fluid through the interior of said filter element and into said reservoir; and a second filter element supported within said first mentioned filter element and extending across the interior thereof to filter fluid being introduced into said reservoir through said first mentioned filter element.

2. A fluid filter device as defined in claim 1, wherein said housing opening and said reservoir opening have a size sufficient to permit said filter element to be withdrawn from within said housing and said reservoir.

3. A fluid filter device as defined in claim 2, wherein said cover member is adapted to sealingly close off said reservoir opening.

4. A fluid filter device as defined in claim 2, including a second filter element disposed between said opening and said chamber and effective to remove foreign matter from said replenishment fluid.

5. A fluid filter device as defined in claim 1, including means for removing magnetically attractive foreign matter from the fluid flowing through said filter element.

6. A fluid filter device as defined in claim 1, wherein said housing includes an annular rib adjacent said inlet, and further including resilient means urging said filter assembly toward said inlet so that said annular support member seats in said annular rib and said annular support member presents pressure areas exposed to fluid pressure at said inlet and said outlet so that a pressure differential associated with the filtering condition of said first filter element produces an axial force on said annular support in opposition to said resilient urging means of a magnitude sufficient to move said annular support member from said first position and toward said second position.

7. A fluid filter device as defined in claim 6, including means exposed exteriorly of said reservoir and operably connected to said annular support member to indicate the axial position thereof.

8. A fluid filter device as defined in claim 7, wherein said filter assembly comprises;

(a) a rigid, elongated cylindrical filter element, (b) a first cap member having an opening associated with one end of said cylindrical filter element, (c) a second cap member associated with the opposite end of said cylindrical filter element, said second cap member having an opening defined therein, one of said cap members having a cup-shaped configuration;

(d) means for securing said cylindrical filter element in a sandwiched relationship between said first and second cap members, and (e) a cup-shaped mesh member nested within said cup-shaped mesh member nested within said cup-shaped cap member and effective to strain foreign matter from said replenishment fluid.

9. A fluid filter device as defined in claim 8, wherein said resilient urging means comprises a spring bias member having a first end acting against said first cap member and a second end reacting against said cover member and operative when said cover member is in said closed position to urge said filter assembly towards said housing inlet.

10. A fluid filter device as defined in claim 9, including an elongated guide member carried by said cover member and extending axially into said housing when said cover member is in said closed position, an annular member axially slidably carried by said guide member between axially spaced positions toward and away from said cover member, a resilient member supported between said cover member and said annular member and biasing said annular member away from said cover member, said annular member acting against said filter assembly to urge said filter assembly toward said inlet and said first position, and the pressure differential at said inlet effective to produce movement of said filter assembly and said annular member toward said cover member in opposition to said spring bias member.

11. A fluid filter device as defined in claim 9, including means carried by said cover member and effective to indicate the fluid level within said reservoir.

12. A fluid filter device as defined in claim 11, wherein said last mentioned means comprises an aperture in said cover member, a dip stick received through said aperture with a length sufficient to indicate the fluid level in said reservoir when withdrawn therefrom and means providing a fluid seal between said dip stick and said aperture when said dip stick is inserted in said aperture.

References Cited

UNITED STATES PATENTS

| 337,486 | 3/1886 | Derham | 210—90 X |
|---|---|---|---|
| 1,817,329 | 8/1931 | Wichmann | 210—315 X |
| 2,583,522 | 1/1952 | Winslow et al. | 210—223 |
| 3,288,289 | 11/1966 | Rosaen | 210—172 X |
| 3,288,290 | 11/1966 | Rosaen | 210—172 X |
| 3,326,375 | 6/1967 | Rosaen | 210—90 |

FOREIGN PATENTS 1,003,557  9/1965  Great Britian.

SAMIH N. ZAHARNA, Primary Examiner

U.S. Cl. X.R.

210—91, 172, 223, 315

PO-1050
(5/69)

UNITED STATES PATENT OFFICE
CERTIFICATE OF CORRECTION

Patent No. 3,486,622            Dated December 30, 1969

Inventor(s) N. O. ROSAEN, et al

It is certified that error appears in the above-identified patent and that said Letters Patent are hereby corrected as shown below:

Col. 8, lines 1 and 2, delete "said cup-shaped mesh member nested within".

SIGNED AND
SEALED
JUN 30 1970

(SEAL)
Attest:

Edward M. Fletcher, Jr.
Attesting Officer

WILLIAM E. SCHUYLER, JR.
Commissioner of Patents